Oct. 29, 1963  H. L. PHILLIPS ETAL  3,108,327
MOLD FOR USE IN MAKING DIE FOR FORMING CARDBOARD BLANKS
Filed Feb. 18, 1960  5 Sheets-Sheet 1

FIG_1

FIG_2

FIG_3

INVENTORS.
HARRY L. PHILLIPS
BY LYTTON S. FAIN

ATTORNEYS

Oct. 29, 1963 H. L. PHILLIPS ETAL 3,108,327
MOLD FOR USE IN MAKING DIE FOR FORMING CARDBOARD BLANKS
Filed Feb. 18, 1960 5 Sheets-Sheet 2

INVENTORS.
HARRY L. PHILLIPS
BY LYTTON S. FAIN

ATTORNEYS

Oct. 29, 1963   H. L. PHILLIPS ETAL   3,108,327
MOLD FOR USE IN MAKING DIE FOR FORMING CARDBOARD BLANKS
Filed Feb. 18, 1960   5 Sheets-Sheet 3

FIG_7

FIG_8

INVENTORS.
HARRY L. PHILLIPS
BY LYTTON S. FAIN

ATTORNEYS

FIG_9

FIG_10

INVENTORS.
HARRY L. PHILLIPS
BY LYTTON S. FAIN

ATTORNEYS

FIG_11

United States Patent Office

3,108,327
Patented Oct. 29, 1963

3,108,327
MOLD FOR USE IN MAKING DIE FOR FORMING CARDBOARD BLANKS
Harry L. Phillips, Piedmont, and Lytton S. Fain, San Leandro, Calif., assignors to Floseal Corporation, San Francisco, Calif., a corporation of Delaware
Filed Feb. 18, 1960, Ser. No. 9,545
9 Claims. (Cl. 18—36)

This invention relates to a mold for use in making a die that includes a die body having conventional steel, blank-forming rules therein with the working edges of said rules projecting from said die-body for forming carton blanks from cardboard, and is a continuation in part of application Serial No. 754,632, filed August 12, 1958, and issued July 25, 1961, to United States Letters Patent No. 2,993,421.

One of the problems that has heretofore existed in the art of making blanks, such as, for example, the blanks from which frozen food cartons are formed, has been the problem of obtaining and maintaining uniform accuracy. Carton blanks of the above type employ elements integral therewith that must register with each other, or with printing, or with parts of automatic machinery, during the forming, folding or filling operations.

In forming the blanks it is essential, from the standpoint of economy, to use a plurality of dies at the same time in the press. A group of such dies is called a "ten on die" or a "twenty on die," according to whether there are ten, twenty, or other number of dies. In smaller dies the number may be quite high, and where larger dies are used, the number is fewer.

The conventional practice of making these dies is to cut and bend the cutting and creasing rules to the desired shapes and to cut wooden pieces to fit between the rules for supporting them. In a ten on die, for example, the die maker heretofore will make ten separate dies by hand, and the dies so made are then locked in a chase and each die is distinguished from the others by a suitable number or symbol to be embossed on the blank that is cut, so as to identify the blanks according to the die that has cut them.

By this system it is impossible to produce dies that are identical with each other, and it is impossible to maintain the accuracy of the cutting rules for any predictable period of time. This is understandable when it is considered that in many single dies fifty-five and more wooden pieces must be separately cut from wood, by a saw, many of which pieces are quite small and intricate. The slight unavoidable variation from the contours that a perfect pattern for the carton or blank would require may permit shifting of some of the rules at any time after the die goes into use, with consequent failure of the blanks to properly fold, or to cooperate with the automatic folding and filling machines in the folding and filling operations, or parts of the blank may fail to properly register with imprinting thereon. Such failures, due to the shifting of the rules, is quite prevalent in the industry. Furthermore this failure occurs most frequently with respect to the more intricately cut and creased portions where absolute accuracy is essential but a change in any part of the die is communicated to the other parts.

Also, in dies that employ wooden blocks, changes in temperature and humidity have a definite effect on the accuracy in the relative positions of the creasing and cutting rules.

Where, for example, one or more of the dies in, say a ten-on-die, becomes faulty after a run is started, through shifting of certain of the rules, the fault will not be discovered until the user of the carton blanks, formed by the die in which rules have shifted, finds that they cannot be properly folded and filled by automatic machinery. Failure in the dies will not appear until after hundreds or thousands of the blanks have been formed.

Inasmuch as the faulty blanks bear the same identifying indicia, all blanks bearing said indicia are discarded and are charged to the manufacturer, who must bear the loss. The discovery of the faulty cartons in itself may be quite costly to the user as well as to the manufacturer for the reason that the blanks are folded and filled in many plants, such as in the frozen food industry, at approximately the same time, at the rate of three to four hundred per minute. Failure of cartons to fold and close properly about their contents when they are being filled at the rate of three to four hundred per minute not only results in the loss of the cartons and their contents, but also in the time lost in stopping the folding and filling machinery and clearing out the scattered product.

One of the objects of the present invention is to provide means for economically, rapidly, and reliably producing any desired number of dies for forming blanks of any type from simple to highly complex blanks, and which dies are absolutely identical to each other, and will maintain the accuracy of the rules, insofar as their relative positions are concerned, for their period of usefulness.

A still further object of the invention is the production of an improved master die or dies and any number of molds therefrom that will exactly duplicate the master dies in any number of such reproductions.

Another object of the invention is the provision of a mold from which any desired number of uniform and extremely accurate dies may be formed.

In explanation of the above, in say a ten-on-die, each die is separated from dies adjacent thereto by cutting rules, some of which may perform cuts that define edges common to the adjacent blanks cut by the rules. Any error in the dimensions of the dies will be cumulative if the dies have the same errors, but in any event an error in one die will be communicated to the others. With the conventional methods of making dies by cutting the individual blocks to substantially conform to different sizes and contours, it has been found impossible to avoid errors since it is impossible for a workman to exactly duplicate dimensions and shapes. This, of course, requires an extended make-ready period at the time the dies are locked in the chase, which period, includes the lock-up time, and may be many hours, and after that time absolute accuracy is not accomplished, but is merely approached to within limits that are expected to be satisfactory. Abnormal changes in temperature and humidity cannot be calculated in advance, nor can their effect on the dies be predicted with any degree of accuracy. It should also be noted that the make-ready time in many instances includes the time required for insuring, with fair accuracy, registration between the cutting and creasing rules and type or printing plates that are to print material on the blanks.

The present invention provides a method of forming dies that are so highly accurate that the lock-up time for say a ten-on-die may be completed in a matter of minutes, where many hours are required by the conventional method, and the present dies are not affected by humidity, or temperature changes within the most extreme variations encountered in actual practice, and which dies are substantially indestructible in use, except for the normal wearing of cutting edges of the rules. Also the dies are precise in their accuracy and uniformity and will not lose their accuracy and uniformity under most severe normal usage.

Another of the objects of the present invention is the provision of a die that is adapted to frictionally hold substantially all of the rules for handling of the die as a unit independently of a chase or holding frame, and which rules may be selectively withdrawn and replaced for re-ruling the die.

A still further object of the invention is the provision of a multiple-die made up of a plurality of identical dies, in each of which dies the majority of the rules are frictionally held, independently of a holding chase or frame, and which rules may be withdrawn and replaced for re-ruling the dies without unlocking the chase holding them, and in which multiple die any of the rules may be withdrawn and replaced for selective re-ruling upon unlocking the chase, without disturbing the other rules.

In explanation of the above several objects, heretofore in say a conventional ten-on die there may be considerably more than five hundred separate blocks in the die, and each of these is separable from the others and from the rules, so that the sole means for holding them in positions supporting the rules, is the chase. When the chase is tightened by the quoins, the hundreds of blocks and rules may move relative to each other until they are held together by the pressure of the chase. The movement of the rules and blocks under the pressure exerted thereon is unpredictable, and, of course, the rules in each of the ten separate dies usually have shifted relative to the other dies. The time required to again shim the rules and blocks in the chase is the lock-up time.

In the present invention, it is impossible for the rules in the dies to move relative to each other or for the dies to move relative to each other since the outlines of the separate dies are uniform and there is no possibility of shifting the rules in the dies relative to each other no mater how much pressure is placed on the dies by the chase.

Furthermore, each working die, in the present invention, is virtually a rigid unit even though the rules extend completely through the body of the die and even though the rules may be withdrawn for re-ruling, hence there can be no relative movement between rules in the die when one or more of the rules in the body of the die, is or are withdrawn for re-ruling, and this is true whether the dies are locked in the chase or whether the dies are loose.

Other objects and advantages will appear in the description and drawings.

Figure 1:
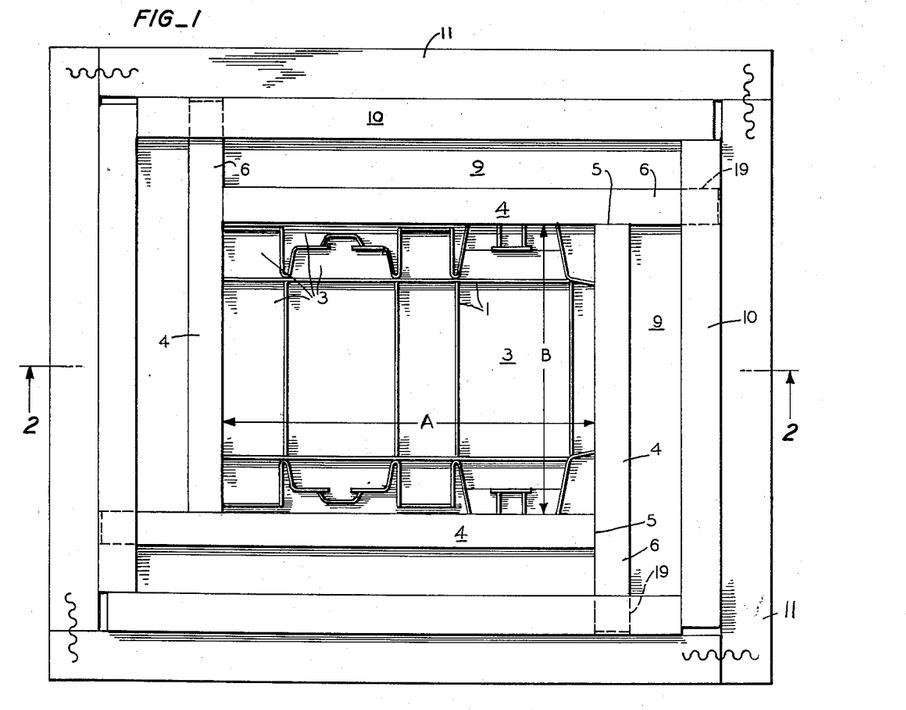
FIG. 1 is a top plan view of a first die for use in making a mold.

The die illustrated in FIG. 1 is the initial die that is made in the present method. To distinguish it from the actual production dies, it will be termed "a pattern."

Figure 2:
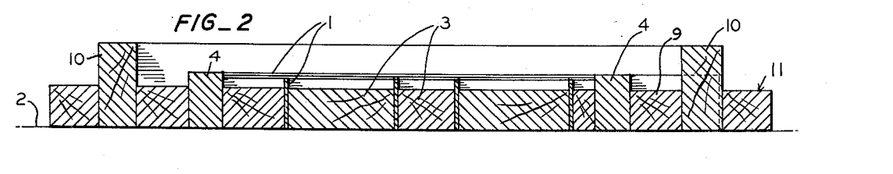
FIG. 2 is a sectional view taken along line 2—2 of FIG. 1.
Figure 3:
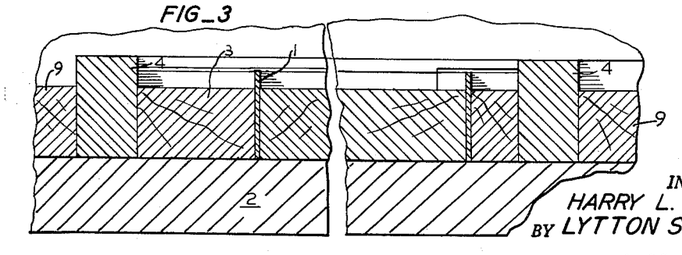
FIG. 3 is an enlarged fragmentary sectional view, also along line 2—2 of FIG. 1, but omitting the central portion of the die.

The conventional steel rules 1 are supported on a flat rigid base 2 (FIG. 2). These rules are supported by wooden blocks 3 that are cut by a saw or saws from plywood to approximate as nearly as possible the outlines of areas between and defined by adjoining rules, for supporting the rules in positions in which their working edges will cut and crease a sheet of cardboard along the lines for forming the blank.

Enclosing the rules and blocks are rails 4, which rails are preferably made of aluminum and are oblong in cross sectional contour (FIG. 2). These rails are made with extreme accuracy so that their sides are flat and exactly at right angles to each other.

These rails 4 are preferably arranged so that the one end of the rail in each adjacent pair of rails abuts the side of the other rail of each such pair, as at 5, at a point spaced from the adjacent end of such other rule, so that the latter projects at 6 beyond the rail that abuts it. The rails are positioned on base 2 so their greatest thickness is vertical, and the thickness or height is slightly greater than the height of the rules. As is customary, the cutting rules are slightly greater in height than the creasing rules, and have sharpened upper edges while the upper edges of the creasing rules are not sharp. It is obvious, of course, that all of the rules may be cutting rules, although where carton blanks are being formed, there are both cutting and creasing rules. The cutting or creasing edges of the rules may be generally designated their "working edges."

The inner sides of the rails accurately define the outline of a rectangle, the length of each side being the thickness of a rule less than the maximum distance between the outermost edges of the carton that is to be cut.

Figure 11:
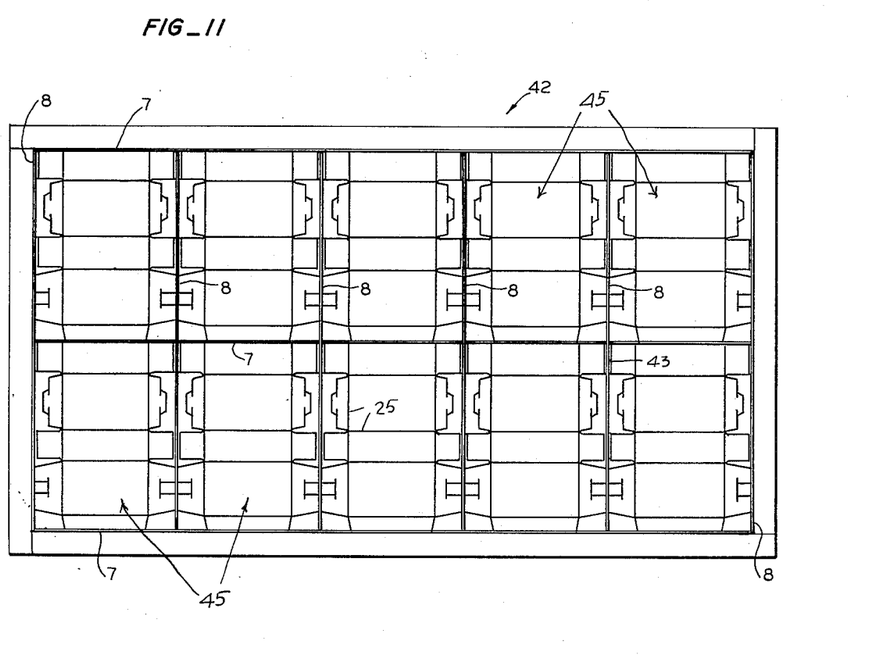
FIG. 11 is a plan view of a ten-on die made up from ten of the dies that are formed from the step disclosed in FIGS. 9, 10.

In the example shown (FIG. 1), the distance A will be less, by the thickness of a rule, than the length of a blank since in the final multiple die, such as the ten-on die of FIG. 11, rules 7, not provided in FIG. 1 will be positioned to form the two opposite end edges of the blank and one of these rules is common to the adjoining die in the ten-on die.

The dimension B (FIG. 1) likewise is less, by the thickness of a rule, than the maximum width of the die perpendicular to dimension A, since in the multiple die of FIG. 11, rules 8 will be positioned to form the two opposite side edges of the blank along the distance of maximum width, and these rules also will be common to adjacent dies.

It is to be understood that rules 7, 8 do not necessarily define the actual outlines of the carton blanks, since certain flaps or marginal portions of each blank may be cut out within the outlines defined by rules 7, 8, and after the final cutting operation, parts of the blank between rules 7, 8 and the other rules defining portions of the outline of the blank within the confines of rules 7, 8 may be stripped away.

The rails 4 have blocks 9 outwardly thereof (FIG. 1) and a rectangular frame 10 outside the blocks. A chase or frame 11 may hold the assembly of rules, blocks, rails and frame 10 tightly together.

The members forming the frame 10 are oblong in cross sectional contour and are substantially wider (vertically) than the rails 4, hence they project a substantial distance above the upper level of said rails.

In the assembly of the rules, blocks, rails, etc. of FIGS. 1, 2 it is possible to obtain great accuracy on the positions of the rules and rails, since thin or thick shims, some of which may be quite fragile and relatively easily displaced, may be used to secure absolute accuracy. This pattern will not be used to form cartons. Its sole use is to provide an accurate pattern from which molds for forming one or more duplicate master patterns, or one or more working dies may be made, as will be described later on. It should be noted that were the pattern of FIG. 1, or one similarly made in the conventional way, to be used as a working die, the high degree of accuracy required and procured by the present method, and means, would not be obtainable for the reason that the shims and means employed for obtaining the desired accuracy normally would not hold up under actual use in cutting and creasing cardboard blanks, and could not be made to do so.

Figure 4:
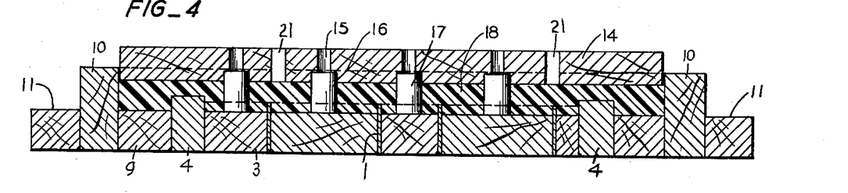
FIG. 4 is a sectional view similar to that of FIG. 1 but showing the mold being formed.

After the elements of FIG. 1 have been assembled and absolute accuracy is obtained within say approximately one or several thousandths of an inch, as compared with say a thirty-second of an inch tolerance, or an optimum sixty-fourth of an inch, by conventional methods, the next step is taken, which is illustrated in FIG. 4.

First the exposed portions of the blocks, frame, rules and rails of FIG. 1, within the confines of the frame 10, are coated with a parting wax or medium to preclude the sticking thereto of the plastic that is used, which plastic, is preferably an epoxy compound. A rectangular panel 14 of plywood, such as used in making conventional dies, is made, the outline of which is such as to slidably fit within the frame 10, and this panel is formed with spaced openings 15 that are counterbored at 16 from one of the sides thereof (FIG. 4). Frictionally fitted within the counterbores are cylindrical pins 17 that project from the panel a distance equal to the thickness of the plastic 18 that is to be poured over the pattern of FIG. 1 within the confines of the frame 10, and to a level that is preferably slightly less than the distance the frame 10 projects above blocks 3 and 9, and which blocks preferably are of substantially the same vertical thickness. It may be noted at this point that the frame numbers 10 are recessed on their undersides at 19 (FIG. 1) to pass one of the ends of each of the rails 4, and these recesses preferably fit over said ends so that little, if any, plastic will flow between the sides of said recesses and said ends.

Pins 17 also have their exposed surfaces coated with a parting wax since their sides will be surrounded by the plastic and they must be movable relative thereto. However, no wax is on panel 14.

An epoxy compound of a blend that is impervious to water and unaffected by changes in atmospheric temperature and humidity, and which compound will cure in a few hours or less without noticeable shrinkage, expansion or distortion is poured onto the portion of the die of FIG. 1 that is within the confines of frame 10, so that the rules and rails are covered to a height that is slightly less than the upper level of frame 10. Then the panel 14, with pins 17 projecting downwardly therefrom, is positioned over the body of plastic 18 and is forced downwardly until the outer ends of the pins are against blocks 3. A number of openings 21 larger than openings 15 may be formed in panel 14 to permit any excess plastic to be displaced into said openings to insure pins 17 being against blocks 3 although the block or panel 14 is not necessarily so tightly fitted as to prevent passage of plastic therepast.

Figure 5:
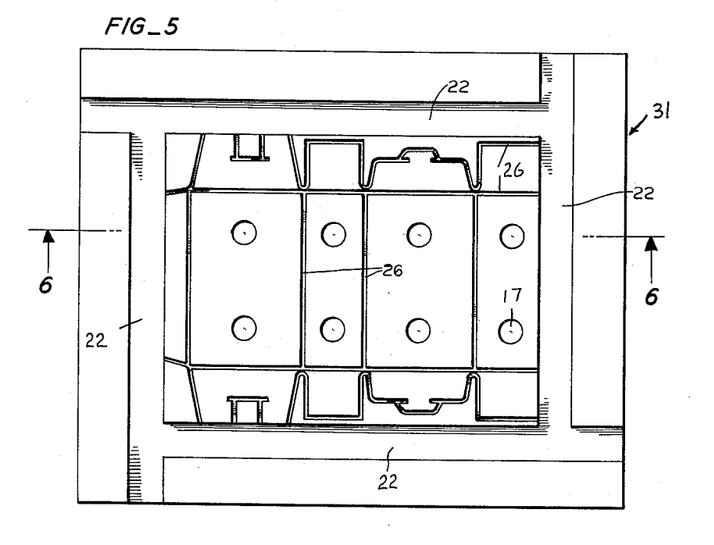
FIG. 5 is a top plan view of the mold that is formed by the step shown in FIG. 4.

The pins 17 are positioned on panel 14 so as to be located in spaces between the larger areas of the pattern of FIG. 1 which areas are usually outlined by the rules that define the sides, top and bottom of the carton to be formed. FIG. 5 shows a satisfactory arrangement.

The above described characteristics of the plastic have been found, in the case of the epoxy compound, to be obtainable only when the plastic is maintained within approximately ten degrees of predetermined temperature, which, in the present instance, will preferably not vary substantially more than approximately five degrees above or below 70° F., and the constituents of the epoxy compound including the dies preferably should be at approximately said temperature at the time the plastic is poured. The viscosity of the latter enables it to readily follow the exposed surfaces within the confines of frame 10 so as to form an accurate mold of said surfaces.

An epoxy tooling resin formulation comprising a metal filled epoxy compound, has been found to meet the above requirements. The metal filler, which may comprise approximately eighty percent of the compound, may be steel or a suitable metal alloy, according to the strength desired. The pot life and curing time may vary, but at the present time a suitable metal filled epoxy compound having a pot life of approximately one hour and a curing time of from two to three hours is available.

In view of the above, it is desirable in the present method to maintain an enclosed area within which the pattern and epoxy compound and hardener are kept, and in which the patterns, molds and dies are formed and cured, at approximately 70° F. and all of the materials and elements employed are stored in this area so as to be at approximately said temperature when used.

Upon curing, the epoxy compound 18 will tightly adhere to the panel 14 and within approximately several hours' time said plastic will be hard and separable from the pattern of FIG. 1.

Pins 17 function as knock-out pins, which pins may be tapped through holes 15 to facilitate loosening the mold (now carried on panel 14) from the pattern. The wooden panel functions to hold and to position the knockout pins within the plastic.

FIG. 5 is a plan view of the mold that is carried by panel 14 which is a part thereof. One of the distinctive and important characteristics of this mold is the recesses 22 formed by rails 4. These recesses are precisely of the same cross sectional contour as three sides of the rails 4, and in the next step, in the forming of a die, the rails 4 will be inserted in these recesses to define the sides of the die that will be formed. These sides must be highly accurate in every respect in order to accomplish the desired results, and the recesses 22 so closely receive the rails that the latter must be tapped into place, and when in place the distances between the opposed surfaces of opposite rails are precisely the dimensions described when the rails 4 were positioned in the pattern of FIG. 1. Also the inner surfaces of the rails are exactly perpendicular to the base of the die to be formed, so that rules positioned against said surfaces will be perpendicular to such base.

After the mold of FIG. 5 is formed, and removed from the pattern of FIG. 1, the latter is valueless insofar as using it for another pattern, without completely restoring it to the substantial condition of FIG. 1, which would require many hours of costly labor.

In many instances, such as where different plants in different localities may wish to produce molds for making the same working dies, it is desirable that virtually unitary master patterns be provided for such plants that correspond to the patterns of FIG. 1, insofar as the portion that is within the confines of the rails 4 is concerned.

Figure 6:
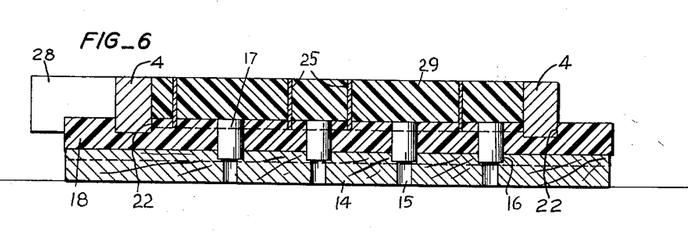
FIG. 6 is a sectional view of a step for producing a master die from the mold of FIG. 5, the mold section being taken along line 6—6 of FIG. 5.

Such master patterns are produced by the step illustrated in FIG. 6. Rules 25 (FIG. 6) corresponding to the rules in the pattern of FIG. 1 are placed in the grooves 26 (FIG. 5) of the mold of FIG. 5, and rails 4 are positioned in the recesses 22 in said mold. The rails will bear the same relation to each other in the mold of FIG. 5 as they did in the pattern of FIG. 1 and will project at one of their ends beyond each edge of the mold, as shown at 28.

Before placing the rules 25 in the mold, and which rules include all of the rules shown in FIG. 1 (their cutting and creasing edges being tight against the bottoms of the grooves 26, the surface of the mold including the inner and top surfaces of the rails 4 and the exposed ends of the knock-out pins 17 are covered with a parting wax. However, the rules are not so covered.

After the rules 25 are in place, a metal filled epoxy compound, indicated at 29, is poured into the area enclosed by the rails 4 to the level of the upper surface of the rails which is the upper level of the uppermost edges of the cutting and creasing rules, but not above said edges, and said edges are kept clear of the plastic (FIG. 6).

The epoxy compound 40 (FIG. 10) may be an aluminum or silica filled epoxy compound having a weight similar to the weight of wood, and having all of the desired characteristics already mentioned. For example, an 80% aluminum, 20% epoxy compound, plus the catalyst that is added to start the hardening reaction, is only slightly heavier than wood, in the same volume.

The epoxy compound 29 employed for the master patterns may, if desired, also be an aluminum filled epoxy compound, but since the master dies or patterns are not used in a press, and since the steel filled or other metal filled epoxy compound are harder and tougher than the dies of the aluminum filled epoxy compound. It is preferable in most instances to use the harder and tougher compound for the master die.

Figure 7:
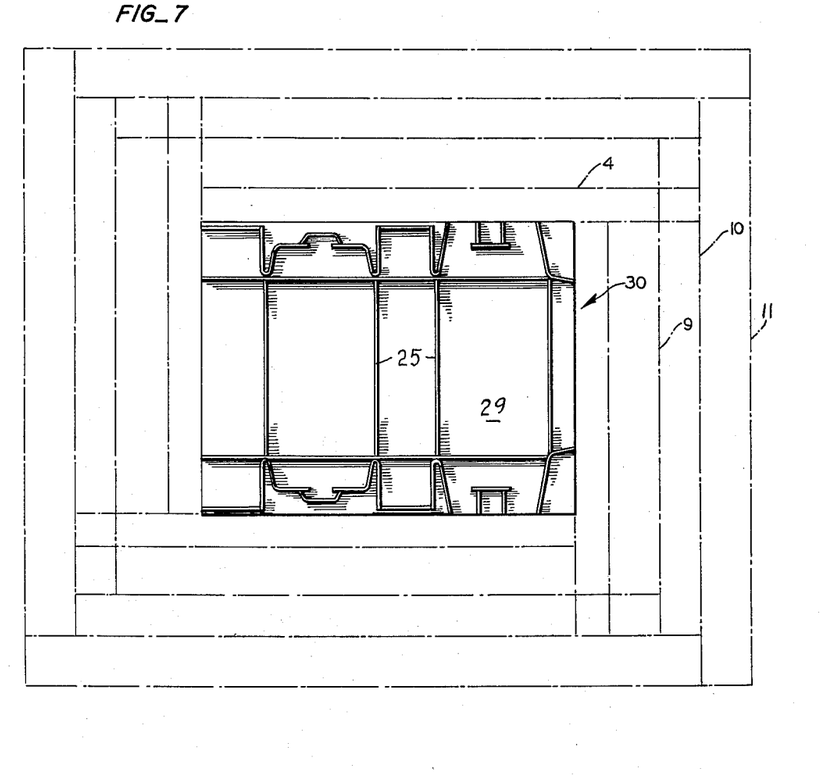
FIG. 7 is a top plan view of the die formed by the step illustrated in FIG. 6, the dot-dash lines indicate the elements used in FIG. 1 around the die proper, and which elements would be similarly employed for use with the die of FIG. 7.

Upon curing in several hours' time in the curing room as already explained, the rails may be removed by tapping their projecting ends 28 upwardly and the plastic body 29 and the rules may be removed, as a unit from the mold by tapping on the knock-out pins 17 through holes 15. The epoxy compound will have adhered to the rules so as to become inseparable therefrom, and then this plastic body with the rules therein as substantially an integral part thereof, will become a master pattern generally designated 30 (FIG. 7) that may be used to form subsequent molds by locking this pattern in rails 4 and blocks 9 and a frame 10, the same as used in FIG. 1. FIG. 7 indicated said rails and blocks and frame in dot-dash lines.

From the foregoing it will be seen that any number of mastern patterns 30 may be produced from the mold of FIG. 5 and each pattern 30 will be identical in every respect to the others. These master patterns will never be subject to change for the rules are substantially integral with the plastic, in which respect they differ from working dies, since, in the working dies, it is desirable that the rules be replaceable should they become worn or accidentally nicked or otherwise injured.

Figure 8:
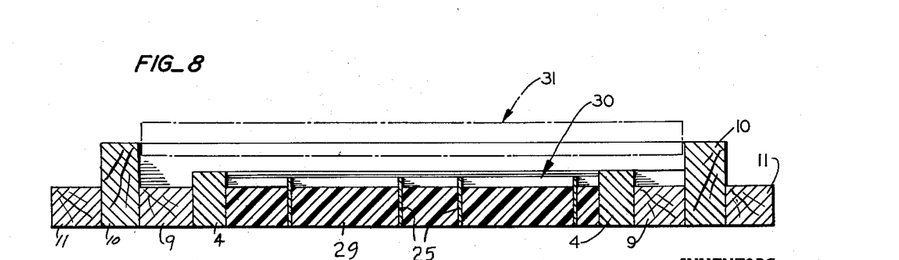
FIG. 8 is a sectional view similar to that of FIG. 2 but in which the die of FIG. 7 is used.

Molds corresponding to the mold of FIG. 5 and indicated in dot-dash lines at 31 in FIG. 8 may be produced from each pattern 30 when the pattern 30 is locked up as seen in FIGS. 7, 8 the rails 4, blocks 9 and frame 10 and chase 11 being identical to those shown in FIG. 1. These molds are the same in every respect as shown in FIG. 5 and as the mold produced from the pattern of FIG. 1.

Figure 9:
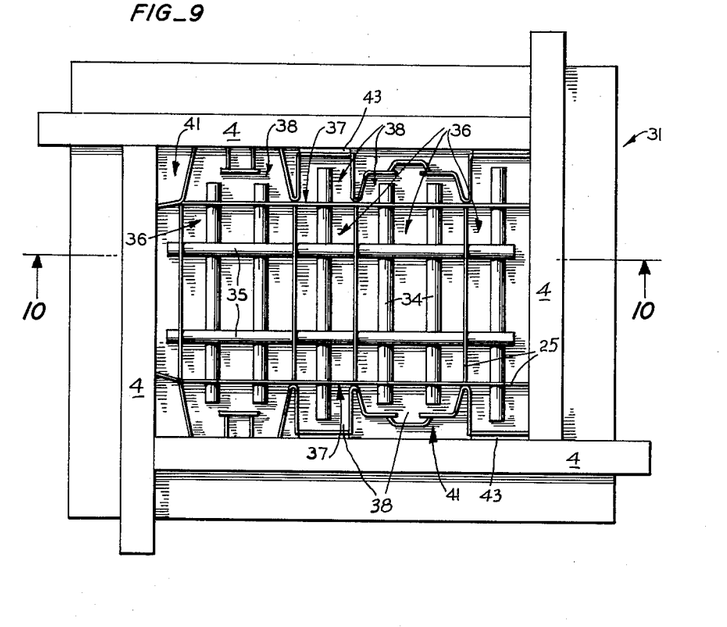
FIG. 9 is a top plan view of a mold like that in FIG. 5 but having the outer rails and reinforcing bars in position for forming a die.
Figure 10:
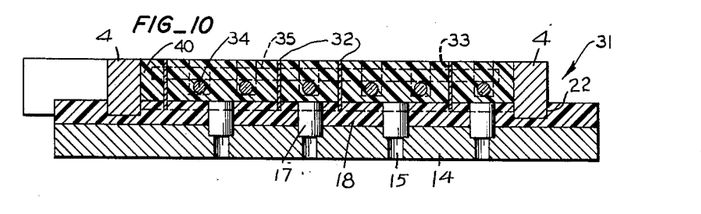
FIG. 10 is a sectional view of the mold of FIG. 9 taken along line 10—10 of FIG. 9 showing the die being formed.

FIGS. 9, 10 illustrate the production of a working die from the mold of FIG. 5, it being understood that said mold is the same whether produced from the pattern of FIG. 1 or that of FIG. 7.

In producing the working die, the mold (FIG. 5), generally designated 31 is fitted with rails 4 and rules 25 corresponding to those of the pattern of FIG. 1 (or FIG. 7). These rails and rules so closely fit in the recesses 22 and grooves 26 that they must be tapped into position by a mallet, and when so seated the rules and rails are rigidly held exactly at right angles to the base of the mold, and to the plane in which the base edges 32 of the rules (which are apparent in FIG. 10) are positioned.

The rules 25 are formed with notches or recesses 33 that open outwardly of the base edges of the rules.

As seen in FIG. 9 these notches are so positioned as to be in alignment along lines perpendicular to the rails 4, at each of the two opposite sides of the mold, and are positioned to receive aluminum reinforcing rods 34, 35, the rods 34 being below rods 35 in the notches that are aligned on lines perpendicular to two of the opposed rails 4, while rods 35 are in the notches that are on lines perpendicular to the other two opposed rails. These rods 34, 35 are positioned to be parallel with and alongside the longer rules that outline the larger areas within the blank that is to be cut by the die, and they are spaced from said rules. In FIG. 9 a preferred arrangement is illustrated, in which said rods not only extend across the larger areas generally designated 36, but rods 34 extend across the rules 37 that define two opposite sides of such areas and into areas 38 that are outlined by rules that define the outlines of flaps that are to be cut outside areas 36.

The recesses or notches 33 in the rules are such that the lowermost rods 34 in FIGS. 10, 11 are spaced from the lower surface of the mold, and preferably the uppermost rods are spaced from the base surface (shown uppermost in FIG. 10) of the die that is to be formed, which later surface is coplanar with the base edges of the rules.

The exposed inner and upper surfaces of rails 4 and the upper surface of mold 31 within the confines of rails 4, including the exposed ends of the knock-out pins 17, and all of the rules, are coated with a parting wax or medium; a metal filled epoxy compound 40 is then poured into the mold within the confines of rails 4 and to substantially the upper level of the rails, which upper level, as stated, is coplanar with said base edges 32 of the rules.

It may be desirable to position a flat panel or slab (not shown) over and against the rails and base edges of the rules, with or without a rubber sheet or blanket between the panel and said rails and base edges, with a weight or pressure on such panel to displace any plastic that may be on the upper surfaces of said rails or base edges, or the upper surface of the plastic may be sanded after hardening to remove possible deposits of plastic on said base edges. It is essential that the base edges of the rules firmly seat on the rigid bed when the die is used.

After several hours' time, and under temperature conditions already mentioned for the mold 31 and pattern 30, the plastic will be hardened and adhered to the rods 34, 35 and may be removed from the mold by tapping on the knockout pins, after removal of the rails 4. It is preferable to remove the rails first so as to insure against any possible distortion of the die, should it not be completely hardened.

Any number of dies may be produced by repeating the method described. In the case of the ten-on die of FIG. 11, ten such dies generally designated 45 are produced, and each die is identical in every respect to the other.

In setting up a ten-on die such as seen in FIG. 11, the cutting rules 7 may extend longitudinally of two rows of dies, there being five dies in each row, and rules 7 are between said dies and along the outermost sides of the pair of rows. Cutting rules 8 extend crosswise of the rows at the ends thereof and between the adjacent pairs of dies in the pair of rows. As already explained, where rules define the outermost edges of the blanks and whose rules that extend between the adjacent dies will cut from cuts common to adjacent blanks.

The ten dies and rules 7, 8 are tightly locked in a conventional chase, generally designated 42 which includes conventional quoins, etc. not shown.

In a ten-on die as illustrated in FIG. 11 and other multiple dies, the actual variation in overall dimensions from a theoretically perfect multiple die, will not be measurable from a practical standpoint. This means that the make-ready step including the lock-up time, which has taken many hours heretofore, may be completed more rapidly than where conventional dies are used, and therefore the cartons cut by these dies will be exactly the same and will remain uniform for the life of the dies. When any rules may become dull, they can readily be replaced without affecting the other rules.

From the foregoing, it is seen that the pressure applied by the chase in locking up the dies is transmitted from die to die, and not to the individual rules through the blocks of material between them. Since each die is an exact duplicate of the others, and their outside dimensions are exactly the same, and perfectly rectangular, it is manifest that there can be no possible shifting of any of the rules relative to others due to the pressure from the chase, and it is equally manifest that no such shifting can occur during use of the dies. Thus the obtaining of perfect registration between the dies and type for printing matter on the blanks can be obtained and maintained with absolute precision, and likewise, the essential cooperative relationship between different cutting and creasing rules in each die for cutting and creasing portions in a blank that must register with great accuracy, may be obtained and maintained for the useful life of the die, and therefore re-ruling may be effected without altering the accuracy or requiring adjustment.

At this point it may be pertinent to note that the cardboard normally used for producing carton blanks is moisture absorbent and such cardboard will shrink and expand according to the relative humidity of the atmosphere.

With conventional dies, while the attainable accuracy in cutting and creasing blanks for a particular carton may be satisfactory at the time the die was made, upon the cardboard shrinking at a later time, or by the time the die is used, the blanks formed are inoperative for properly folding and filling due to the lack of sufficient tolerances to enable the blanks to compensate for such changes as may occur due to the change in the dimensons of the cardboard because of a change in the relative humidity. In a conventional multiple die, one or any number of the internal dies may be rendered useless, since uniformity is unattainable and each die may change relative to the others, due to humidity and temperature changes.

In the present invention, where extremely high accuracy is uniformly obtained to the same degree in each die, and where each die is virtually unaffected by humidity and temperature changes, all of the blanks that are cut will uniformly shrink and stay will within the relatively short range of change that may occur and still be satisfactory.

It has been mentioned that the initial pattern is not usable as a working die due to the relatively delicate means that may be used, such as fragile thin shims at different points where relative slight pressures on the rules would destroy their accuracy.

The flowable plastic herein used readily fills in the spaces between and around the rules without disturbing them, and at no time are they struck or engaged by any foreign objects, other than the plastic. This is noted here because the placing of any hard object on the rules would in some instances be sufficient to cause them to shift, and to thereby destroy the accuracy of the pattern. No such object engages the rules, by the present method at any time after the pattern is formed.

While the claims and description specifically mention the dies as being adapted for use in cutting and creasing cardboard blanks, it is to be understood that the invention is not restricted to such material, nor to forming carton blanks. However, the method is particularly suited to the forming of carton blanks that must be uniformly formed with high accuracy in large quantities for reasons explained hereinbefore.

It is also to be understood that the term "flat bed press" as used herein is intended to cover any of the conventional presses adapted to use the conventional dies of the type illustrated herein and called a "pattern," as distinguished from rotary presses having cylindrical dies.

The invention has been described herein more or less precisely as to details, but it is to be understood that the invention is not to be limited thereby as changes may be made in the arrangement and proportion of parts and equivalents may be substituted without departing from the spirit and scope of the invention.

Such changes may occur in the formula for the epoxy compound. Inorganic fillers have been used to reduce the weight of the die to one that is even lighter than wood, and which has all of the desired characteristics. Normally in larger or thicker dies the curing time and heat developed are greater than in smaller dies of less thickness. The heat developed during curing is preferably relatively low, being relatively close to 100° F.

The steel rules being good conductors of heat, and being distributed through the die, cooperate with the metal rods 34 and with the knock out pins 17 to conduct heat away from the compound, which is desirable in maintaining the desired characteristics of the plastic.

In actual use, the plastic, being impervious to moisture, will neither swell nor shrink irrespective of the presence of moisture in the cardboard or atmosphere, and any heat developed in the rules during cutting will merely tend to tighten the rules in the die.

We claim:

1. A mold for use in making a die that includes a die body having conventional steel, blank-forming rules therein with the working edges of said rules projecting from said die-body for forming carton blanks from cardboard, comprising;
   (a) a flat-sided slab-like body of hard plastic material;
   (b) a plurality of grooves formed in one flat side of said body;
   (c) said grooves corresponding exactly in linear contour and in cross sectional contour to the working edges of the blank forming rules in the die to be formed, and to the marginal portions of said rules along said working edges; and
   (d) the depths of said grooves being equal to the distances said working edges of said rules are to project from the die-body of the die to be formed;
   (e) means integral with said slab-like body positioned within the confines of the outline of said body for removably and rigidly supporting rigid frame members of rectangular cross sectional contours on said slab-like body projecting to the same side of said slab-like body as that in which said grooves are formed and in a position enclosing the area in which said grooves are located.

2. In a mold as defined in claim 1,
   (f) said last mentioned means being recesses formed in the side of said slab-like body in which said grooves are formed having flat parallel opposed sides perpendicular to the surface of said slab-like body in which said grooves are formed for frictionally engaging opposite sides of such frame members respectively, for so holding them in said recesses when such frame members are seated in said recesses.

3. A mold for use in making a die that includes a die body having conventional steel, blank-forming rules therein with the working edges of said rules projecting from said die-body for forming carton blanks from cardboard, comprising;
   (a) a flat-side slab-like body of hard plastic material;
   (b) a plurality of grooves formed in one flat side of said body;
   (c) said grooves corresponding exactly in linear contour and in cross sectional contour to the working edges of the blank forming in the die to be formed, and to the marginal portions of said rules along said working edges; and (d) the depths of said grooves being equal to the distances said working edges of said rules are to project from the die-body of the die to be formed;

(e) said slab-like body being rectangular, and (f) a rectangular frame releasably held in said body and projecting outwardly of the side of said body in which said grooves are formed and at right angles to said side, a distance substantially equal to the distance such rules are adapted to project when the latter are seated in said grooves and recesses formed in said one flat side having the same cross sectional contour as that of the portion of said frame held in said body.

4. In a mold as defined in claim 3;

(g) said frame being in four separate straight, elongated pieces of the same cross sectional contour whereby said pieces are adapted to be separately seated in and removed from said recesses, and;

(h) said recesses opening into each other at their ends and the (i) terminating end of one frame member of each adjacent pair abutting a side of the end portion of the other frame member.

5. In a mold as defined in claim 3;

(g) said frame being in four separate, straight, elongated pieces of the same cross sectional contour whereby said pieces are adapted to be separately seated in and removed from said recesses;

(h) each of said recesses extending to one of the edges of said slab-like body and opening outwardly of said one of said edges;

(i) each of said frame members extending at one of its ends outwardly of said one of the edges of said slab-like body to enable engagement with the projecting end of each member for removing each member from the recess in which it is seated in a direction perpendicular to the side of the slab-like body in which said grooves and recesses are formed.

6. A mold for use in making a die that includes a die-body having conventional steel, blank-forming rules therein with the working edges of said rules projecting from said die-body for forming carton blanks from cardboard, comprising;

(a) a rectangular, rigid preformed panel material having planar, parallel opposite sides;

(b) one side of said panel being covered with a layer of hard plastic material in tight adherent engagement with said one side;

(c) a plurality of grooves formed in the side of said layer that is opposite to said panel adapted to tightly and rigidly, but releasably, hold said conventional steel rules along their working edges in positions corresponding to the positions of such rules in the die to be formed;

(d) said grooves being of depths equal to the distances said working edges are to project from the die-body to be formed and (e) the thickness of said layer at said grooves being greater than said last mentioned distances whereby grooves for rules having cutting edges as their said working edges may be deeper than the grooves for rules having creasing edges as their working edges and the surface of said layer that is opposite to the side thereof that is in engagement with said panel being parallel with said opposite sides of said panel.

7. In a construction as defined in claim 6;

(f) four, straight, elongated recesses extending at right angles to each other formed in the same side of said layer as said grooves defining a recess of rectangular outline around said plurality of grooves;

(g) said recesses being adapted to tightly but releasably hold frame members therein rigid relative to said layer and to each other and projecting from the side of said body in which said grooves are formed, and (h) a plurality of said frame members tightly but releasably held in said recesses and projecting from the side of said layer in which said grooves are formed.

8. A mold for use in making a die that includes a die-body having conventional, steel, blank forming rules therein with the cutting and creasing edges of said rules projecting from one side of said die body for forming carton blanks from cardboard and which rules have base edges opposite to said creasing and cutting rules that are coplanar, said mold comprising;

(a) a pre-formed panel of rigid material;

(b) a layer of plastic material covering and substantially inseparably secured against one side of said panel and having a planar surface opposite to the side thereof that is remote from the side that is against said panel;

(c) a plurality of grooves formed in said planar side of said layer and conforming in cross sectional contour to the cross sectional contour of the cutting and creasing edges of said rules and arranged to correspond to the linear contours of said rules and to the pattern formed by the latter;

(d) the depths of said grooves being equal to the distances said cutting and creasing edges are to project from the die-body to be formed;

(e) rigid, straight, separate frame members spaced inwardly from the outer edges of said layer extending at right angles to each other and in a common plane defining the outline of a rectangular frame having flat inwardly facing surfaces that are exactly perpendicular to said plane;

(f) and means integral with said layer releasably supporting and holding said frame members to said layer in a position surrounding said plurality of grooves, and with said inner surfaces at right angles to said planar surface and extending outwardly therefrom;

(g) the portions of said inner surfaces extending outwardly from said planar surface defining the exact dimensions of such die-body to be formed and the edges of the latter;

(h) the portions of said frame members respectively defining each of the four sides of said frame being wholly disposed within the confines of the projected outline of said layer.

9. In the molding art, a mold pattern and mold formed thereon, said mold pattern comprising;

(a) a conventional, wooden furniture die of rectangular outline adapted to form a carton blank from a sheet of cardboard, said die including;

(b) conventional steel cutting and creasing rules having lower coplanar base edges on which said rules are adapted to be supported, and vertical lateral sides perpendicular to the plane in which said base edges are disposed, and cutting and creasing edges along the upper edges of said rules;

(c) conventional rule holding and positioning blocks between said rules supporting them against movement relative to each other and to said blocks with the lower sides of said blocks coplanar with said base edges and with said cutting and creasing edges and the marginal portions of said rules therealong projecting above said blocks;

(d) an inner rectangular frame around said blocks and rules holding them together rigid relative to each other and projecting above said blocks approximately the same distance as said cutting and creasing edges;

(e) an outer rectangular frame spaced outwardly of and enclosing said inner frame and projecting a substantially greater distance above said blocks than said cutting and creasing edges;

(f) an epoxy resin compound filling said outer frame above the upper level of the upper surfaces of said blocks and confined within said outer frame and in tight, cast, frictional engagement with the portions of said rules and inner frame that project above the said upper surfaces;

(g) said compound being hardened and cured in said tight, cast, frictional engagement from a liquid condition and being separable from said blocks, rules, and said inner and outer frames to provide a mold that is formed with grooves and recesses that are exactly complementary in their contours to portions of said rules and inner frame that project above the upper surface of said blocks, and that is adapted to receive and to tightly hold said cutting and creasing rules and said inner frame for casting on said mold a die-body substantially corresponding to said blocks and having an outline corresponding to the inner surfaces of said inner frame.

References Cited in the file of this patent

UNITED STATES PATENTS

| | | |
|---|---|---|
| 1,308,330 | Brown | July 1, 1919 |
| 2,263,001 | Gunsaulus et al. | Nov. 18, 1941 |
| 2,826,968 | Phillips | Mar. 18, 1958 |
| 2,856,637 | Daniel | Oct. 21, 1958 |
| 2,863,337 | Ackley | Dec. 9, 1958 |
| 2,865,235 | Phillips | Dec. 23, 1958 |
| 2,885,933 | Phillips | May 12, 1959 |
| 2,915,789 | Dykstra et al. | Dec. 8, 1959 |
| 2,981,330 | Stickney et al. | Apr. 25, 1961 |